(12) United States Patent
Uchida et al.

(10) Patent No.: US 11,077,787 B2
(45) Date of Patent: Aug. 3, 2021

(54) CONTROL DEVICE FOR VEHICLE HEADLAMPS

(71) Applicant: Stanley Electric Co., Ltd., Tokyo (JP)

(72) Inventors: Mitsuhiro Uchida, Osaka (JP); Yasushi Kita, Tokyo (JP); Takako Kimura, Tokyo (JP); Takeshi Waragaya, Tokyo (JP); Wataru Nakashima, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/643,762

(22) PCT Filed: Sep. 7, 2018

(86) PCT No.: PCT/JP2018/033199
§ 371 (c)(1),
(2) Date: Mar. 2, 2020

(87) PCT Pub. No.: WO2019/049986
PCT Pub. Date: Mar. 14, 2019

(65) Prior Publication Data
US 2020/0223351 A1    Jul. 16, 2020

(30) Foreign Application Priority Data

Sep. 8, 2017   (JP) .............................. JP2017-173143

(51) Int. Cl.
*B60Q 1/24*   (2006.01)
*H05B 47/115*   (2020.01)
*B60Q 1/04*   (2006.01)

(52) U.S. Cl.
CPC ............. *B60Q 1/24* (2013.01); *H05B 47/115* (2020.01); *B60Q 1/04* (2013.01)

(58) Field of Classification Search
CPC .......... H05B 47/115; B60Q 1/24; B60Q 1/04; B60Q 1/00
(Continued)

(56) References Cited

U.S. PATENT DOCUMENTS

| | | | |
|---|---|---|---|
| 9,771,021 B1* | 9/2017 | Lindsay | B60Q 1/085 |
| 2015/0137680 A1* | 5/2015 | Komatsu | F21S 41/16 |
| | | | 315/82 |
| 2015/0329043 A1* | 11/2015 | Skvarce | B60R 21/34 |
| | | | 340/435 |

FOREIGN PATENT DOCUMENTS

| | | |
|---|---|---|
| EP | 3 147 157 A1 | 3/2017 |
| JP | 2013-82253 A | 5/2013 |

(Continued)

OTHER PUBLICATIONS

International Search Report of the International Search Report for PCT/JP2018/033199 dated Nov. 27, 2018.

*Primary Examiner* — Alexander H Taningco
*Assistant Examiner* — Amy X Yang
(74) *Attorney, Agent, or Firm* — Kenealy Vaidya LLP (57) ABSTRACT

A control device for vehicle headlamps configured to control illumination with light using headlamps of a vehicle, the control device for vehicle headlamps includes a determination part configured to determine whether the vehicle will collide with an object detected by an object detection part configured to detect an object, and an illumination controller configured to illuminate a region corresponding to the object that has been determined to collide with the vehicle by the determination part with a marking light and configured to illuminate a region around the region corresponding to the object with a background light in which a light intensity level thereof is decreased when a light intensity level of the marking light is increased, by using the headlamps.

6 Claims, 5 Drawing Sheets

(58) Field of Classification Search
USPC .......................................................... 315/82
See application file for complete search history.

(56) References Cited

FOREIGN PATENT DOCUMENTS

| | | | |
|---|---|---|---|
| JP | 2014-184851 A | | 10/2014 |
| JP | 2014184851 A | * | 10/2014 |
| JP | 2017-61206 A | | 3/2017 |
| WO | 2014/024385 A1 | | 2/2014 |

* cited by examiner

CONTROL DEVICE FOR VEHICLE HEADLAMPS

CROSS-REFERENCE TO RELATED APPLICATIONS

This application is a U.S. National Stage Application under 35 U.S.C § 371 of International Patent Application No. PCT/JP2018/033199 filed Sep. 7, 2018, which claims the benefit of priority to Japanese Patent Application No. 2017-173143 filed Sep. 8, 2017, the disclosures of all of which are hereby incorporated by reference in their entireties.

TECHNICAL FIELD

The present invention relates to a control device for vehicle headlamps.

Priority is claimed on Japanese Patent Application No. 2017-173143, filed Sep. 8, 2017, the content of which is incorporated herein by reference.

BACKGROUND ART

In the related art, in order to call a driver's attention to an obstacle present in a direction of advance of the driver who is driving a vehicle, a technology of illuminating with a marking light that emphasizes the obstacle is known (for example, Patent Literature 1).

CITATION LIST

Patent Literature

[Patent Literature 1]
Japanese Unexamined Patent Application, First Publication No. 2013-082253

SUMMARY OF INVENTION

Technical Problem

When an illumination range of the marking light is made conspicuous, there is a case in which the driver's visibility with respect to the background illuminated around the marking light is deteriorated.

An aspect of the present invention provides a control device for vehicle headlamps that does not impair a driver's awareness with respect to the presence of a background and an obstacle.

Solution to Problem

A control device for vehicle headlamps of an aspect of the present invention is configured to control illumination with light using headlamps of a vehicle, the control device for vehicle headlamps including: a determination part configured to determine whether the vehicle will collide with an object detected by an object detection part configured to detect an object; and an illumination controller that is configured to illuminate a region corresponding to the object that has been determined to collide with the vehicle by the determination part with a marking light and that is configured to illuminate a region around the region corresponding to the object with a background light in which a light intensity level thereof is decreased when a light intensity level of the marking light is increased, by using the headlamps.

In the aspect of the above-mentioned control device for vehicle headlamps, the illumination controller may increase a maximum value of the light intensity level of the marking light when a distance between the vehicle and the object determined to collide with the vehicle by the determination part is increased.

In the aspect of the above-mentioned control device for vehicle headlamps, the illumination controller may emit blinking light as the marking light.

Advantageous Effects of Invention

According to the aspect of the present invention, it is possible to provide a control device for vehicle headlamps that does not impair a driver's awareness with respect to presence of a background and an obstacle.

DESCRIPTION OF EMBODIMENTS

Hereinafter, embodiments of the present invention will be described in detail with reference to the accompanying drawings.

First Embodiment

Figure 1:
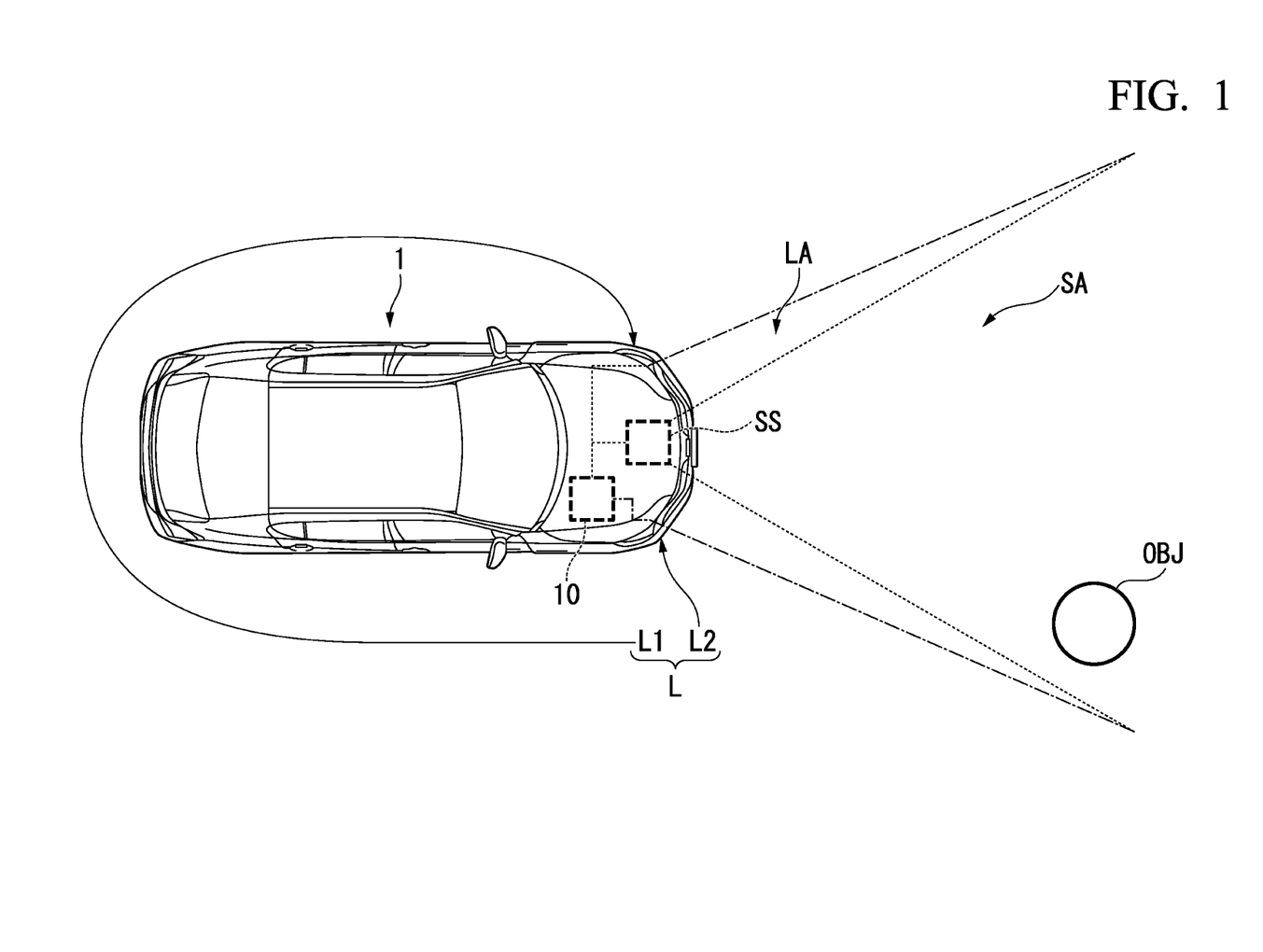
FIG. 1 is a view showing an example of a schematic configuration of a vehicle.

FIG. 1 is a view showing an example of a schematic configuration of a vehicle 1. In the following description, a direction in which the vehicle 1 advances is referred to as "a forward direction." In addition, the vehicle 1 is an automobile.

The vehicle 1 includes a control device 10, a headlamp L1, a headlamp L2 and a sensor SS.

The control device 10 controls the sensor SS, the headlamp L1 and the headlamp L2. In addition, the control device 10 receives traveling information of the host vehicle that is information related to traveling of the vehicle 1 from the vehicle 1. Regarding the traveling information of the host vehicle, arbitrary information may be used, and for example, information of a speed of a host vehicle, information of an attitude of the host vehicle (for example, one or more of an angle, an angular speed and an angular acceleration of the vehicle 1 in a direction of advance), information of a steering device angle (a steering angle) of the host vehicle, information of an acceleration of the host vehicle, information of a position of the host vehicle, or the like, may be used.

The headlamp L1 and the headlamp L2 emits a side in front of the vehicle 1 with light. The headlamp L1 emits, for example, light to a left side in front of the vehicle 1. The headlamp L2 emits, for example, light to a right side in front of the vehicle 1. In the following description, when the headlamp L1 and the headlamp L2 are not distinguished between, they are generally referred to as headlamps L. The headlamps L can control a light intensity showing a level of brightness of emitted light and a range illuminated by the light on the basis of a control signal from the control device 10. In the following description, the case in which the headlamps L normally emits the background light to a background light illumination region BGA will be described.

The sensor SS detects an object OBJ disposed in a detection area SA in front of the vehicle 1. The sensor SS is an example of an object detection part. The sensor SS is, for example, an image sensor such as an imaging device (a camera) or the like, or a distance sensor (radar) configured to acquire information of a distance to the object OBJ present on a side in front of the vehicle 1. The object OBJ is, for example, a pedestrian, a vehicle (a bicycle or a motorcycle) other than a host vehicle, or an obstacle other than the host vehicle.

[Functional Configuration of Control Device 10]

Next, an example of a functional configuration of the control device 10 will be described with reference to FIG. 2.

Figure 2:
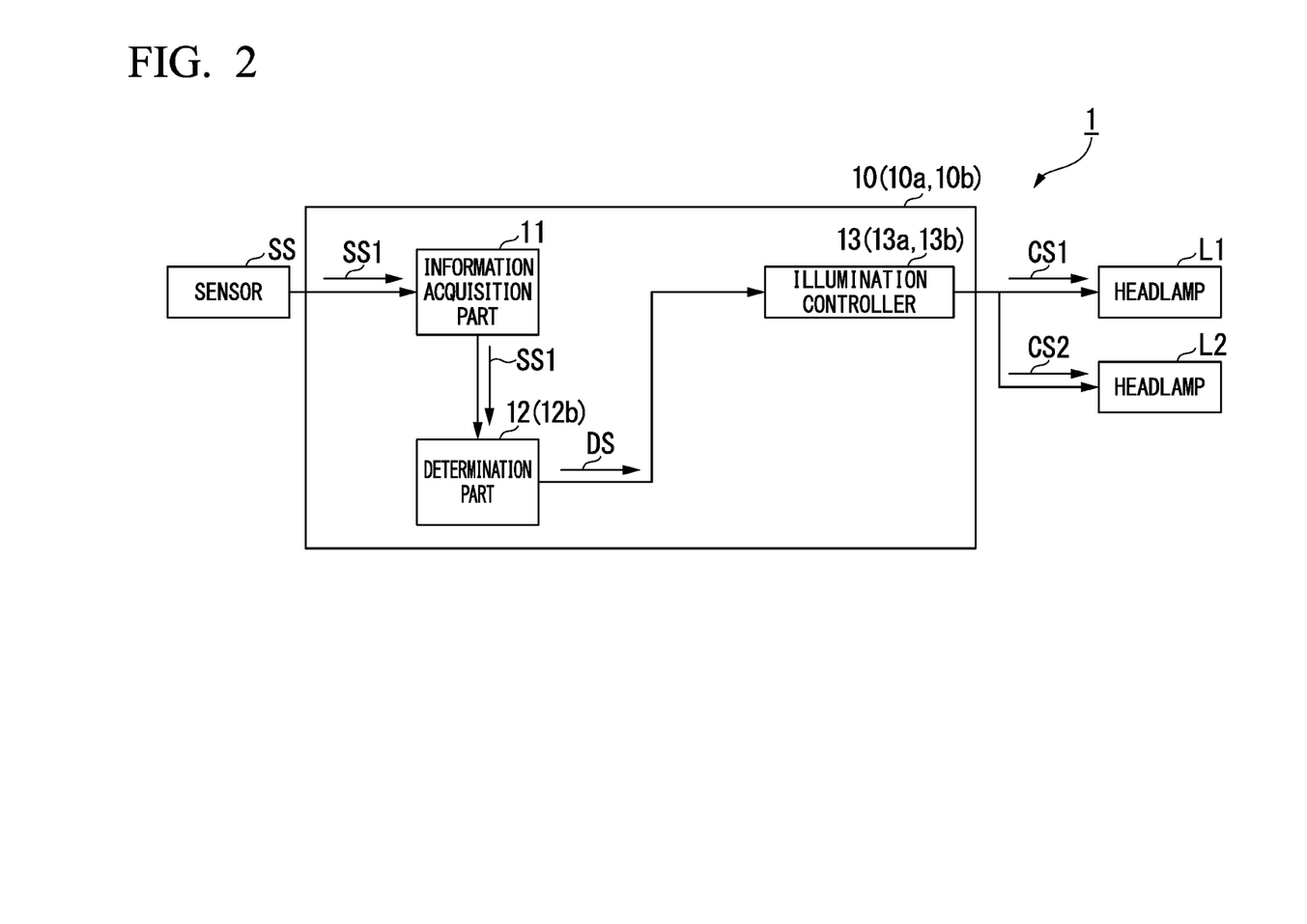
FIG. 2 is a view showing an example of a functional configuration of a control device.

FIG. 2 is a view showing an example of the functional configuration of the control device 10.

The control device 10 includes an information acquisition part 11, a determination part 12 and an illumination controller 13.

The sensor SS outputs a detection signal SS1 showing a position of the detected object OBJ with respect to the vehicle 1, a distance with respect to the vehicle 1, an angle with respect to the vehicle 1, or the like, to the information acquisition part 11.

The information acquisition part 11 receives the detection signal SS1 from the sensor SS. In addition, the information acquisition part 11 receives traveling information of the host vehicle from the vehicle 1. The information acquisition part 11 outputs the detection signal SS1 acquired from the sensor SS and the traveling information of the host vehicle acquired from the vehicle 1 to the determination part 12.

The determination part 12 determines whether the vehicle 1 will collide with the object OBJ detected by the sensor SS. The determination part 12 receives the detection signal SS1 and the traveling information of the host vehicle from the information acquisition part 11. The determination part 12 determines whether the vehicle 1 collides with the object OBJ on the basis of the detection signal SS1 and the traveling information of the host vehicle acquired from the information acquisition part 11. A method of determining whether the vehicle 1 collides with the object OBJ is arbitrary, and for example, a known technology may be used.

The determination part 12 outputs an illumination control signal DS that controls a range of illumination of the background light and the marking light with respect to the object OBJ to the illumination controller 13 when it is determined that the vehicle 1 collides with the object OBJ.

The illumination controller 13 receives the illumination control signal DS from the determination part 12. The illumination controller 13 performs illumination control of the headlamp L1 and the headlamp L2 on the basis of the illumination control signal DS acquired from the determination part 12. Specifically, the illumination controller 13 outputs a headlamp control signal CS1 to the headlamp L1. The headlamp L1 emits the background light and the marking light on the basis of the headlamp control signal CS1 input from the illumination controller 13. In addition, the illumination controller 13 outputs a headlamp control signal CS2 to the headlamp L2. The headlamp L2 emits a light intensity of the emitted light or the marking light on the basis of the headlamp control signal CS2 acquired from the illumination controller 13. In the following description, when the headlamp control signal CS1 and the headlamp control signal CS2 are not distinguished between, they are generally referred to as headlamp control signals CS.

Here, referring to FIGS. 3 and 4, an example of the background light and the marking light emitted to the object OBJ at a position spaced a predetermined distance from the vehicle 1 by the headlamps L will be described.

Figure 3:
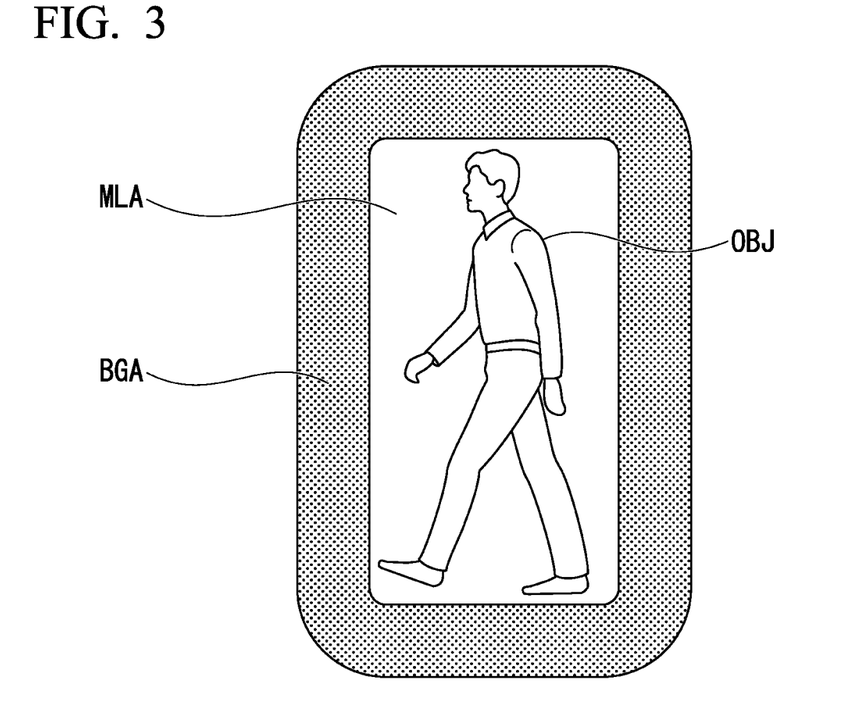
FIG. 3 is a view showing an example when headlamps illuminate an object disposed at a predetermined distance away from a vehicle with background light and marking light.

FIG. 3 is a view showing an example when the background light and the marking light are emitted by the headlamps L with respect to the object OBJ positioned at a predetermined distance from the vehicle 1.

As described above, the headlamps L emits the background light with respect to the background light illumination region BGA. In addition, the headlamps L emits the marking light with respect to the object OBJ. In the following description, the region illuminated with the marking light is also referred to as a marking light illumination region MLA.

Figure 4:
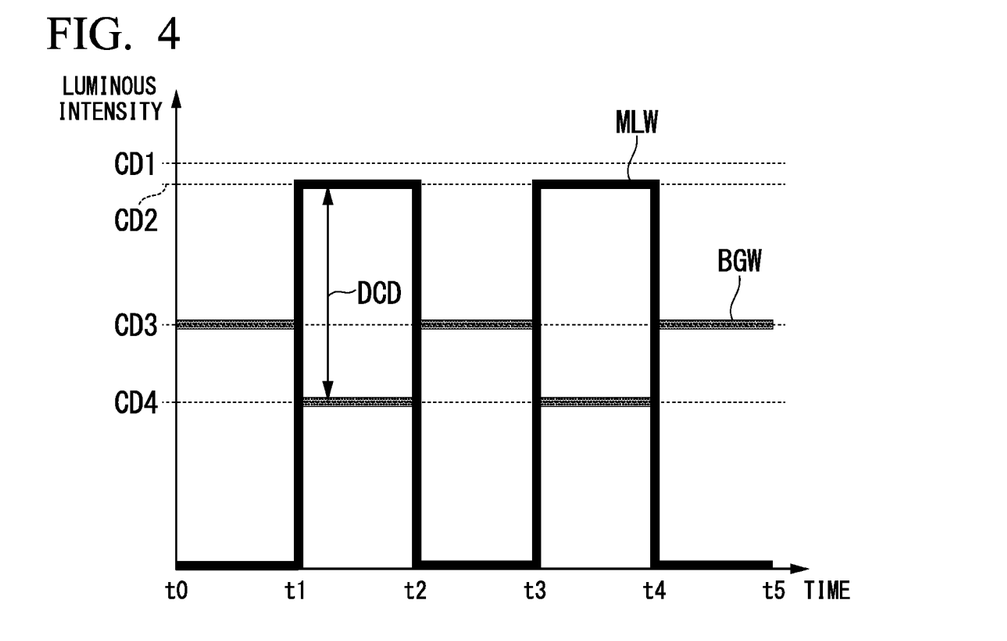
FIG. 4 is a view showing an example of control of a light intensity of the background light and a light intensity of the marking light.

FIG. 4 is a view showing an example of control of a light intensity of a background light and a light intensity of a marking light. A wave form MLW shown in FIG. 4 is a wave form showing the light intensity of the marking light controlled by the illumination controller 13. In addition, a wave form BGW shown in FIG. 4 is a wave form showing the light intensity of the background light controlled by the control device 10.

Here, time intervals from a time point t1 to a time point t2, from the time point t2 to a time point t3, from the time point t3 to a time point t4, and from the time point t4 to a time point t5 shown in FIG. 4 are the same as each other.

Luminous intensities from a light intensity CD1 to a light intensity CD4 shown in FIG. 4 are brightnesses on the side of the object OBJ.

The light intensity CD1 is a predetermined light intensity. The light intensity CD1 is, for example, a brightness of one lux.

A light intensity CD3 is a light intensity at which the background light illumination region BGA is illuminated when illumination with the marking light is not performed.

A light intensity CD2 is a light intensity of the marking light emitted to the position of the object OBJ. The light intensity CD2 is lower than the predetermined light intensity CD1 of the marking light and higher than the light intensity CD3.

The light intensity CD4 of the background light is lower than the light intensity CD3 of the background light when the marking light is not emitted to the object OBJ.

Here, a difference DCD between the light intensity CD2 of the marking light and the light intensity CD4 of the background light is a difference in which sufficient contrast is maintained for the driver to be able to visually recognize the object OBJ from the background.

The illumination controller 13 controls the background light and the marking light emitted from the headlamps L such that the brightness thereof do not exceed the light intensity CD1. For example, the illumination controller 13 performs a control that repeats turning the lights on and off of the marking light at a predetermined time intervals with a brightness at which the light intensity of the marking light does not exceed the light intensity CD1. In addition, the illumination controller 13 lowers the light intensity of the background light to the light intensity CD4 while the illumination of the marking light is performed.

Specifically, the determination part 12 determines that the vehicle 1 collides with the object OBJ at a time point t0.

At this moment, the headlamps L is emitting the background light having the brightness of the light intensity CD3.

For example, the illumination controller 13 emits the marking light of the light intensity CD2 to the marking light illumination region MLA from the time point t1 to the time point t2. In addition, the illumination controller 13 emits the background light of the light intensity CD4 to the background light illumination region BGA from the time point t1 to the time point t2.

The control device 10 increases the light intensity of the background light to the light intensity CD3 during the time point t2 to the time point t3 while the marking light is not emitted to the marking light illumination region MLA. The illumination controller 13 repeats lighting and lights-off of the marking light until the determination part 12 determines that the vehicle 1 does not collide with the object OBJ. In addition, the illumination controller 13 decreases the light intensity of the background light to the light intensity CD4 in accordance with the lighting of the marking light. The illumination controller 13 returns the light intensity of the background light to the original light intensity CD3 in accordance with the lights-off of the marking light.

[Operation Sequence of Control Device 10]

Next, an operation sequence of the control device 10 will be described with reference to FIG. 5.

Figure 5:
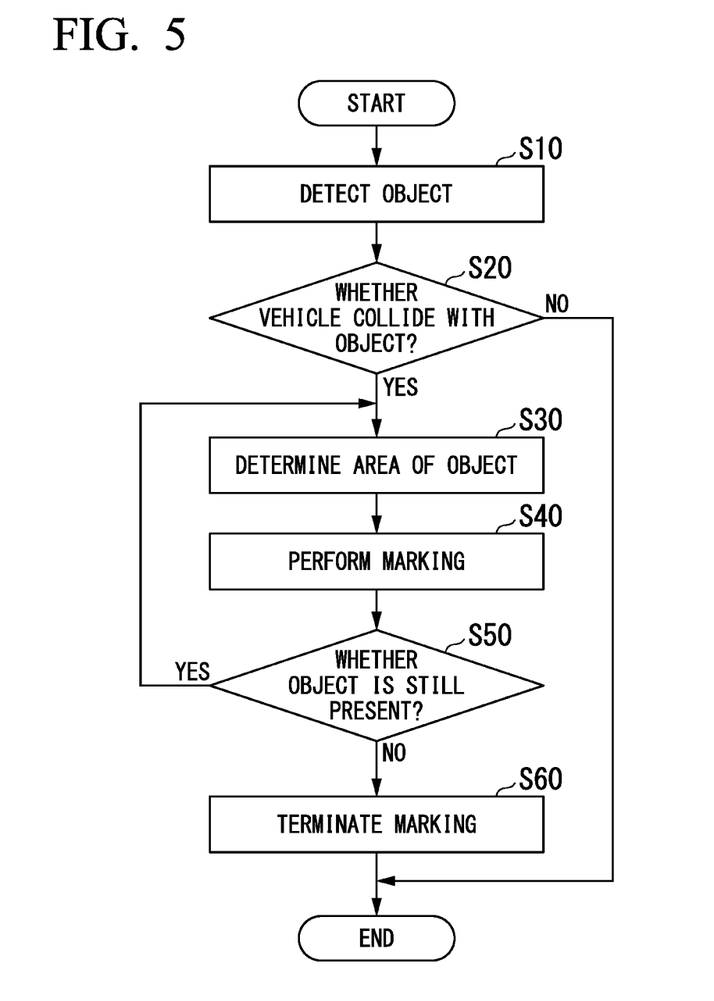
FIG. 5 is a flowchart showing an example of an operation sequence of the control device.

FIG. 5 is a flowchart showing an example of an operation sequence of the control device 10.

The sensor SS detects the object OBJ (step S10). The sensor SS outputs the detection signal SS1 to the information acquisition part 11. The information acquisition part 11 receives the detection signal SS1 from the sensor SS. The information acquisition part 11 outputs the detection signal SS1 acquired from the sensor SS to the determination part 12. The determination part 12 receives the detection signal SS1 from the information acquisition part 11.

The determination part 12 determines whether the vehicle 1 collides with the object OBJ on the basis of the detection signal SS1 acquired from the information acquisition part 11 (step S20).

The determination part 12 terminates the processing when it is determined that the vehicle 1 will not collide with the object OBJ (step S20; NO).

The determination part 12 determines an area of the object OBJ (step S30) when it is determined that the vehicle 1 collides with the object OBJ (step S20; YES). The determination part 12 outputs the illumination control signal DS showing an area, to which the marking light is emitted, in an area of the determined object OBJ, to the illumination controller 13. The illumination controller 13 receives the illumination control signal DS from the determination part 12.

The illumination controller 13 outputs the headlamp control signals CS to the headlamps L on the basis of the illumination control signal DS acquired from the determination part 12. The headlamps L receive the headlamp control signals CS from the illumination controller 13. The headlamps L emits the marking light to the object OBJ on the basis of the headlamp control signals CS input from the illumination controller 13 (step S40). Specifically, the illumination controller 13 emits the marking light to the marking light illumination region MLA that is an area corresponding to the object OBJ, and, when the light intensity level of the marking light is increased, emits the background light with a decreased light intensity level with respect to the background light illumination region BGA that is a region around the region corresponding to the object OBJ.

The determination part 12 determines whether the object OBJ is still in front of the vehicle 1 (step S50).

The determination part 12 returns to step S30 again when it is determined that the object OBJ is still in front of the vehicle 1 (step S50; YES).

The determination part 12 terminates emission of the marking light (step S60) when it is determined that the object OBJ is not present in front of the vehicle 1 (step S50; NO).

Summary of First Embodiment

As described above, the control device 10 includes the illumination controller 13, and thus, controls the light intensity of the background light while the marking light is emitted and the light intensity of the background light while the marking light is not emitted at different luminous intensities with each other. The light intensity of the marking light and the light intensity of the background light while marking light is emitted have a difference that maintains a sufficient contrast for a driver who drivers the vehicle 1 to visually recognize the object OBJ from the background. Accordingly, the visibility of the object OBJ to the driver who is driving the vehicle 1 is not impaired. That is, the control device 10 can provide the control device for vehicle headlamps that does not impair the driver's awareness of the presence of the object OBJ.

In addition, since illumination with the marking light is performed by blinking that repeats turning the lights on and off with respect to the object OBJ, it is easy to draw the driver's attention to the object OBJ. For this reason, driver's awareness can be improved.

Further, in the following description, while the case in which the light intensity when the marking light is turned off is light intensity 0 has been described, there is no limitation thereto. The light intensity during the lights-out may not be light intensity 0. For example, it is sufficient for the illumination controller 13 to emit the marking light as long as the brightness is changed to a light intensity at which the object OBJ can be recognized by the driver.

In addition, in the following description, while the case in which the light intensity on the side of the object OBJ when the marking light is emitted has the constant light intensity CD2 has been described, the light intensity on the side of the object OBJ when the marking light is emitted may not be the constant light intensity CD2.

Second Embodiment

Next, the case in which the predetermined light intensity CD1 of the above-mentioned marking light is a glare level will be described. The object OBJ of the embodiment is a pedestrian. The glare level is a light intensity at a level at which glare (dazzling) occurs to a pedestrian illuminated by the marking light. As described above, the illumination controller 13 emits the marking light having a light intensity lower than a glare level to a pedestrian (the object OBJ).

Summary of Second Embodiment

The marking light emitted from the vehicle in the related art may use light having a high light intensity. When the marking light having the high light intensity is emitted to the pedestrian (the object OBJ), the pedestrian may have glare. The control device 10 according to the second embodiment can provide the control device for vehicle headlamps that does not impair the driver's awareness of the presence of the object OBJ without giving glare to the pedestrian (the object OBJ) by emitting the marking light having a lower light intensity than the glare level to the pedestrian (the object OBJ).

Third Embodiment

Next, a control device 10a according to a third embodiment will be described. The control device 10a according to the third embodiment changes a maximum value of a light intensity level of the marking light according to a distance between the vehicle 1 and the object OBJ. Further, the same configuration and operation as those in the first embodiment and the second embodiment are designated by the same reference numerals and description thereof will be omitted.

The control device 10a includes an illumination controller 13a.

The illumination controller 13a further controls luminous intensities of the background light illumination region BGA and the marking light illumination region MLA controlled by the illumination controller 13 on the basis of the distance between the object OBJ and the vehicle 1.

Figure 6:
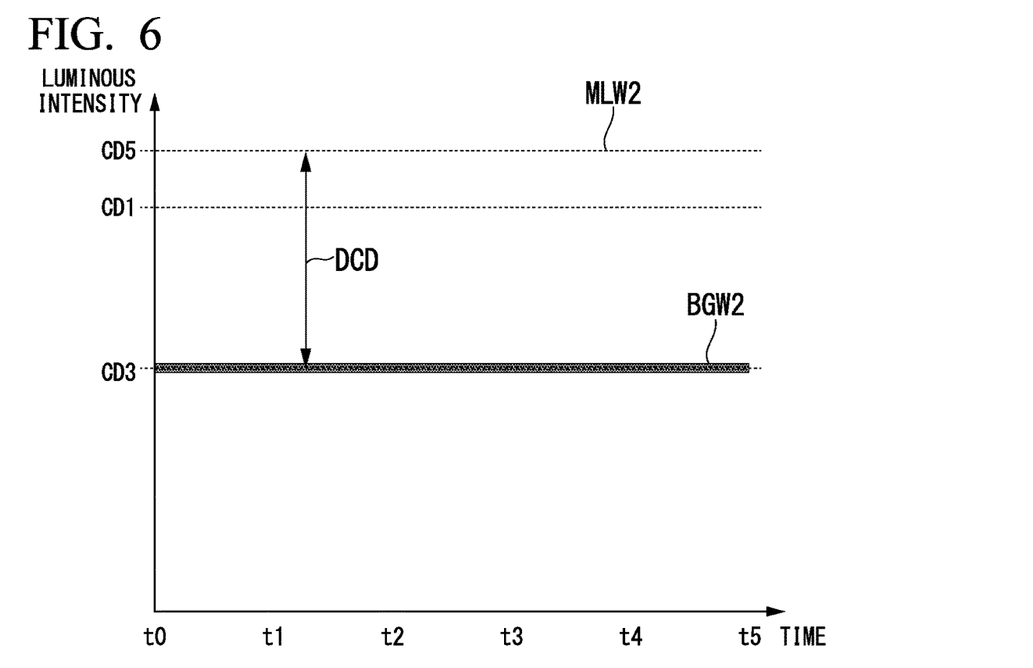
FIG. 6 is a view showing an example of control of a light intensity of a background light and a light intensity of a marking light according to a fourth embodiment.

The illumination controller 13a increases the maximum value of the light intensity level of the marking light when a distance between the object OBJ, which is determined to collide with the vehicle 1 by the determination part 12, and the vehicle 1 is increased. Specifically, for example, as shown in FIG. 6, the illumination controller 13a increases the maximum value of the light intensity level of the marking light when the distance between the vehicle 1 and the object OBJ is increased due to movement or the like of the object OBJ when the marking light is emitted to the object OBJ. For example, the maximum value of the light intensity level of the marking light is greater than the light intensity CD1 shown in FIG. 4 or 6. In addition, a difference between the maximum value of the light intensity of the marking light and the light intensity CD3 of the background light is the difference DCD at which it is possible to maintain sufficient contrast for the driver to visually recognize the object OBJ from the background.

In addition, the illumination controller 13a causes the maximum value of the light intensity level of the marking light to be smaller than the light intensity CD1 when the distance between the object OBJ that is determined to collide with the vehicle 1 by the determination part 12 and the vehicle 1 is reduced. Specifically, for example, as shown in FIG. 4, the illumination controller 13a decreases the maximum value of the light intensity level of the marking light when the distance between the vehicle 1 and the object OBJ is reduced due to movement of the object OBJ when the marking light is emitted to the object OBJ. Here, the difference between the reduced light intensity of the marking light and the light intensity CD3 of the background light is the difference DCD at which it is possible to maintain sufficient contrast for the driver to visually recognize the object OBJ from the background.

Summary of Third Embodiment

The control device 10a according to the third embodiment includes the illumination controller 13a. The illumination controller 13a increases the maximum value of the light intensity level of the marking light when the distance between the vehicle 1 and the object OBJ determined to collide with the vehicle 1 is increased. According to the above-mentioned configuration, the control device 10a can emit the marking light with respect to object OBJ disposed at a position farther than the predetermined distance with a same brightness as that of the object OBJ disposed at a predetermined distance. Accordingly, the driver who drives the vehicle 1 has the visibility that is not impaired even when the object OBJ is disposed at the position farther than the predetermined distance.

Fourth Embodiment

Next, a control device 10b according to a fourth embodiment will be described with reference to FIG. 6. The control device 10b according to the fourth embodiment can change the maximum value of the light intensity level of the marking light by detecting an orientation of a pedestrian's face in the case in which the object OBJ is the pedestrian. Further, the same configuration and operation as those in the second embodiment and third embodiment are designated by the same reference numerals and description thereof will be omitted.

The control device 10b includes a determination part 12b and an illumination controller 13b.

The determination part 12b determines the orientation of the face of the pedestrian (the object OBJ). The determination part 12b determines the orientation of the face of the pedestrian by, for example, detecting the pupils of the pedestrian (the object OBJ). Specifically, the determination part 12b determines that the object OBJ is a pedestrian (person), and detects positions of the pupils of the pedestrian. The determination part 12b determines that the orientation of the face of the pedestrian is not directed to a direction of the headlamps L of the vehicle 1 when the pupils of the pedestrian cannot be detected. In addition, the determination part 12b determines that the orientation of the face of the pedestrian is directed to the direction of the headlamps L of the vehicle 1 when the pupils of the pedestrian are detected. The determination part 12b outputs orientation information showing the determined orientation of the face of the pedestrian to the illumination controller 13b.

The illumination controller 13b controls the light intensity of the marking light on the basis of the orientation information input from the determination part 12b. The illumination controller 13b controls the light intensity of the marking light to the light intensity shown in the above-mentioned second embodiment when the orientation information determines that the pedestrian (the object OBJ) is oriented to the direction of the headlamps L of the vehicle 1. The illumination controller 13b controls the light intensity of the marking light and the light intensity of the background light to the light intensity shown in FIG. 6 when the orientation information determines that the pedestrian (the object OBJ) is not oriented to the direction of the headlamps L of the vehicle 1.

FIG. 6 is a view showing an example of control of the light intensity of the background light and the light intensity of the marking light according to the fourth embodiment. A wave form MLW2 shown in FIG. 6 is a wave form showing the light intensity of the marking light controlled by the illumination controller 13b. In addition, the wave form BGW2 shown in FIG. 6 is a wave form showing the light intensity of the background light controlled by the control device 10b. Here, a light intensity CD5 shown in FIG. 6 is greater than the light intensity CD1 (the glare level).

[Operation Sequence of Control Device 10b]

Next, an operation sequence of the control device 10b will be described with reference to FIG. 7.

Figure 7:
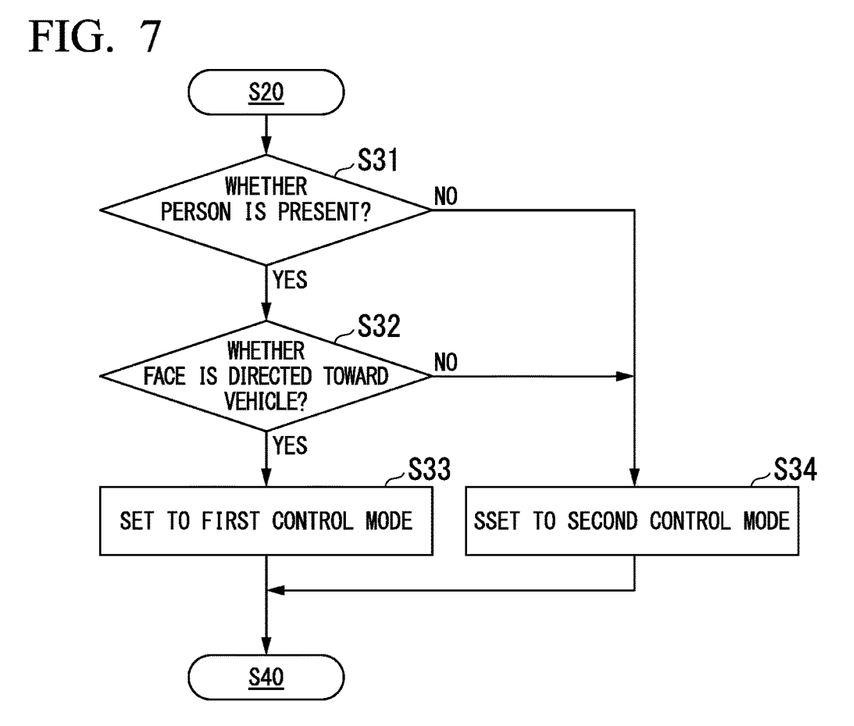
FIG. 7 is a flowchart showing an example of an operation sequence of a control device.

FIG. 7 is a flowchart showing an example of the operation sequence of the control device 10b.

The control device 10b differs the operation sequence in step S30 from the above-mentioned step S10 to step S60.

The determination part 12b determines whether the object OBJ detected by the sensor SS is a person (step S31). The determination part 12b sets the illumination controller 13b to a second control mode (step S34) when it is determined in step S31 that the object OBJ is not a person (step S31; NO). The second control mode is a mode in which the maximum value of the light intensity level of the marking light shown in FIG. 6 is increased and the marking light is emitted.

The determination part 12b determines whether a face of a person detected by the sensor SS is oriented to the direction of the vehicle 1 (step S32) when it is determined that the object OBJ is a person (step S31; YES). The determination part 12b sets the illumination controller 13b to the second control mode (step S34) when it is determined that the face of the person detected by the sensor SS is not oriented to the direction of the vehicle 1 (step S32; NO).

The determination part 12b sets the illumination controller 13b to a first control mode (step S33) when it is determined that the face of the person detected by the sensor SS is oriented to the direction of the vehicle 1 (step S32; YES). The first control mode is a mode in which the marking light having the light intensity that does not exceed the glare level shown in FIG. 4 described in the second embodiment is emitted.

Summary of Fourth Embodiment

As described above, the control device 10b includes the determination part 12b and the illumination controller 13b. The determination part 12b determines an orientation of the face of the pedestrian (the object OBJ). The illumination controller 13b changes the maximum value of the light intensity of the marking light on the basis of the determination result of the determination part 12b. According to the above-mentioned configuration, the control device 10b can provide the illumination control of the marking light that does not provide glare to the pedestrian, i.e., does not impair the driver's awareness of presence of the pedestrian.

Further, for example, a micro electro-mechanical system (MEMS) laser scanning headlamp, a digital micromirror device (DMD) headlamp, a matrix adaptive driving beam (ADB) headlamp, an adaptive driving beam (ADB) headlamp, or the like, may be used as the lamp configured to emit the marking light in the above-mentioned first embodiment, second embodiment, third embodiment and fourth embodiment.

Further, for example, an MEMS laser scanning headlamp, a DMD headlamp, a matrix ADB headlamp, an ADB headlamp, or the like, may be used as a lamp configured to emit the background light in the above-mentioned first embodiment, second embodiment, third embodiment and fourth embodiment.

Further, in the above-mentioned description, while the configuration in which the control device 10 receives the traveling information of the host vehicle from the vehicle 1 has been described, there is no limitation thereto. The control device 10 may also include one or more of, for example, a speed sensor configured to detect information of a speed of a host vehicle, a gyro sensor configured to detect information of an attitude of a host vehicle, a steering device angle sensor configured to detect information of a steering device angle of a host vehicle, an acceleration sensor configured to detect information of an acceleration of a host vehicle, and a position sensor configured to detect information of a position of a host vehicle. Further, for example, a position sensor having a function of a global positioning system (GPS) may be used as the position sensor.

Further, in the above-mentioned description, while the case in which the vehicle 1 is an automobile has been described, there is no limitation thereto. The vehicle 1 may be other vehicle than a motorcycle (autobicycle) or the like.

Further, the lamp configured to emit the above-mentioned marking light may be a common lamp with a lamp configured to emit a background light. The illumination controller 13 emits the marking light to the object OBJ disposed on a front left side of the vehicle 1 by, for example, controlling the headlamp L1. In addition, the illumination controller 13 emits the marking light to the object OBJ disposed on a front right side of the vehicle 1 by controlling the headlamp L2. The illumination controller 13 may emit the marking light using either the headlamp L1 or the headlamp L2 to the object OBJ disposed in front of the vehicle 1.

Hereinabove, while the embodiments of the present invention have been described in detail with reference to the accompanying drawings, the specific configurations are not limited to the embodiments and may be appropriately modified without departing from the scope of the present invention.

Further, the control device 10, the control device 10a and the control device 10b have computers therein. Then, a procedure of each processing of the above-mentioned device is stored in a computer-readable recording medium as a program, and the processing is performed by reading and executing the program using a computer. Here, the computer-readable recording medium is a magnetic disk, a magneto-optical disk, a CD-ROM, a DVD-ROM, a semiconductor memory, or the like. In addition, the computer program may be delivered to a computer by a communication line, and the computer that received the program may execute the program.

In addition, the program may be configured to execute a part of the above-mentioned function.

Further, a so-called differential file (differential program) capable of realizing the above-mentioned function in combination with the program recorded in the computer system may also be provided.

REFERENCE SIGNS LIST

1 . . . vehicle, 10, 10a, 10b . . . control device, 11 . . . information acquisition part, 12, 12b . . . determination part, 13, 13a, 13b . . . illumination controller, SS . . . sensor, L1, L2 . . . headlamps, BGA . . . background light illumination region, OBJ . . . object, MLA . . . marking light illumination region

The invention claimed is:

1. A control device for vehicle headlamps configured to control illumination with light using headlamps of a vehicle, the control device for vehicle headlamps comprising:
   a determination part configured to determine whether the vehicle will collide with an object detected by an object detection part configured to detect an object; and
   an illumination controller that is configured to illuminate a region corresponding to the object that has been determined to collide with the vehicle by the determination part with a marking light and that is configured to illuminate a region around the region corresponding to the object with a background light in which a light intensity level thereof is decreased when a light intensity level of the marking light is increased, by using the headlamps, wherein, in a case where the determination part determines that the object is a person and determines that a face of the person is oriented towards a direction of the vehicle, the illumination controller is set to a first control mode in which the marking light, which has a size larger than the background light and which has a light intensity that does not exceed a glare level, is emitted to the region corresponding to the object, and wherein, in a case where the determination part determines that the object is a person and determines that a face of the person is not oriented towards the direction of the vehicle the illumination controller is set to a second control mode in which the marking light, which has a light intensity that exceeds the glare level, is emitted to the region corresponding to the object.

2. The control device for vehicle headlamps according to claim 1, wherein the illumination controller emits blinking light as the marking light.

3. The control device for vehicle headlamps according to claim 1, wherein the determination part is configured to determine that the face of the person is oriented towards the direction of the vehicle when a pupil of the person is detected.

4. The control device for vehicle headlamps according to claim 1, wherein, in a case where the determination part determines that the object is not a person, the illumination controller is set to the second control mode in which the marking light, which has the light intensity that exceeds the glare level, is emitted to the region corresponding to the object.

5. The control device for vehicle headlamps according to claim 4, wherein the illumination controller emits blinking light as the marking light.

6. The control device for vehicle headlamps according to claim 1, wherein a light intensity of the glare level is a brightness of one lux.

* * * * *